United States Patent [19]

Taniguchi

[11] Patent Number: 5,120,954
[45] Date of Patent: Jun. 9, 1992

[54] CIRCUIT FOR ADJUSTING ENCODER SIGNALS

[75] Inventor: Mitsuyuki Taniguchi, Yamanashi, Japan

[73] Assignee: Fanuc Ltd., Minamitsuru, Japan

[21] Appl. No.: 449,919

[22] PCT Filed: Mar. 31, 1989

[86] PCT No.: PCT/JP89/00348

§ 371 Date: Jan. 30, 1990

§ 102(e) Date: Jan. 30, 1990

[30] Foreign Application Priority Data

Apr. 18, 1988 [JP] Japan .................................. 63-93515

[51] Int. Cl.$^5$ .............................................. G01D 5/34
[52] U.S. Cl. .................................... 250/231.16; 341/13
[58] Field of Search ...................... 250/231.14, 231.16; 341/13, 50, 111, 120

[56] References Cited

U.S. PATENT DOCUMENTS

4,686,510  8/1987  Baker .............................. 250/231.16
4,691,192  9/1987  Baker .............................. 250/231.16
4,970,511 11/1990  Mills ..................................... 341/13

Primary Examiner—David C. Nelms
Assistant Examiner—S. Allen
Attorney, Agent, or Firm—Staas & Halsey

[57] ABSTRACT

An encoder having two encoder units. An encoder having two encoders each having means for storing offset between said two encoder units and means for reading and correcting the offset. An encoder having an encoder with means for storing amplitude difference and phase difference between the encodes and means for reading and correcting the amplitude difference and phase difference, and further having two encoder units and means for generating an offset erasing signal between the two units. An encoder having an encoder that has means for storing offset between each unit and the offset erasing signal generating means, and means for reading and correcting the offset, and further having two encoder units and means for generating an offset erasing signal between the two encoder units. An encoder has means for storing amplitude difference and phase difference between the units, and means for reading and correcting the amplitude difference and phase difference.

17 Claims, 7 Drawing Sheets

CIRCUIT FOR ADJUSTING ENCODER SIGNALS

BACKGROUND OF THE INVENTION

1. Field of the Invention

This invention relates to an improvement applicable to an encoder. More specifically, this invention relates to an improvement applicable to a plurality of means for correction of offset, difference in amplitude and/or difference in phase which may occur in output signals of an optical encoder.

2. Description of the Related Art

Figure 1:
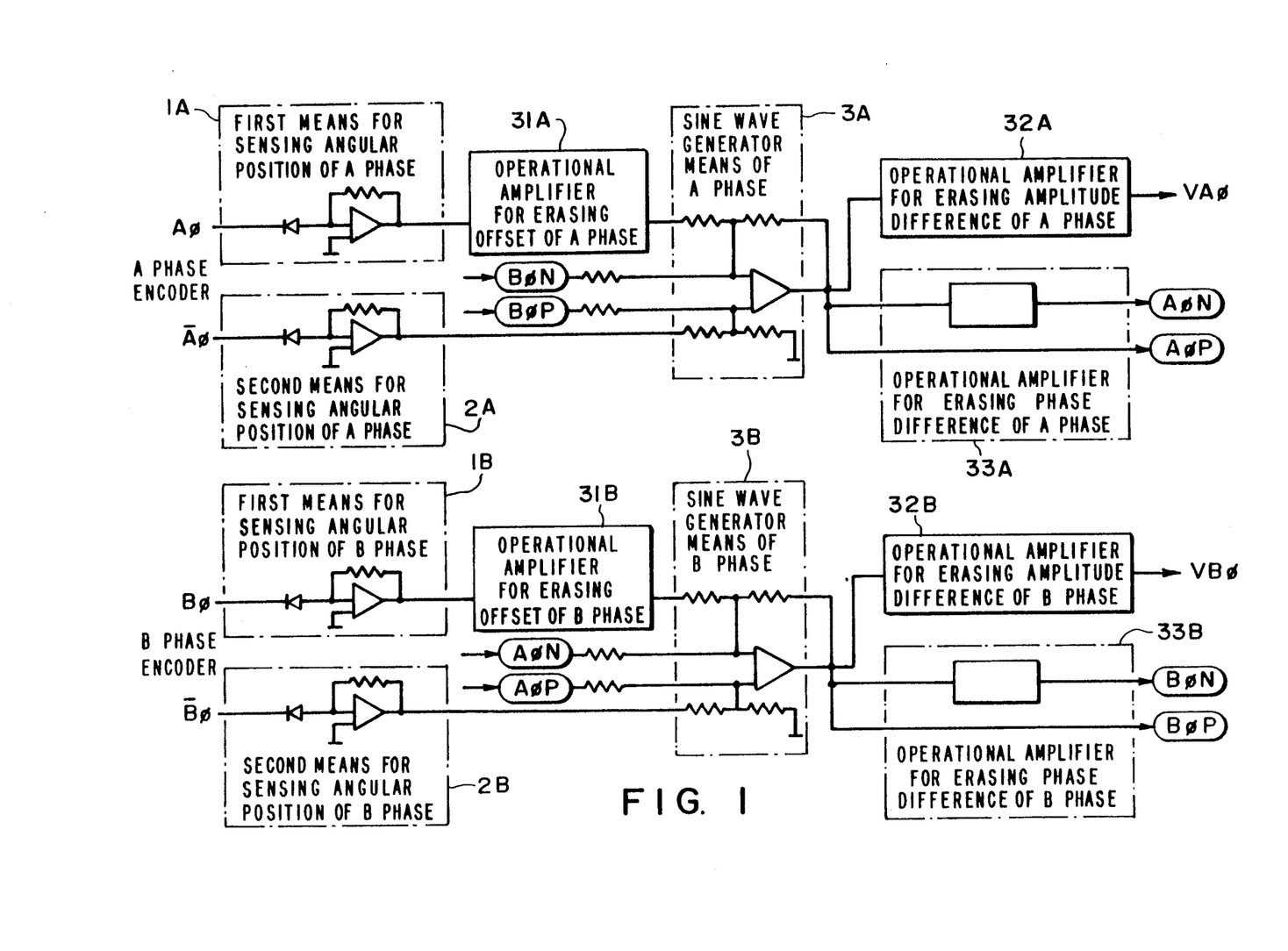
FIG. 1 is a schematic drawing of an encoder available in the prior art.

Referring to FIG. 1, an exemplary means available in the prior art for correction of offset, difference in amplitude and/or difference in phase existing in output signals of an optical encoder.

The upper half of FIG. 1 illustrates an A phase encoder, and the lower half of FIG. 1 illustrates a B phase encoder. The A phase encoder and the B phase encoder are substantially identical to each other, excepting each of them has a function to individually detect the angular position of two independent parts of a single rotator, the angular position of the two independent parts differring from each other by 90 degrees in terms of phase.

A first means for sensing angular position of A phase (1A) detects the inverse phase of the phase which a second means for sensing angular position of $\overline{A}$ phase (2A) detects. The output signals of these two means (1A) and (1B) are input to a sine wave generator means of A phase (3A), which subtracts the one of the two signals from the other of the two signals and generates a sine wave signal which represents the angular position of the rotator. If the sine wave generator means of A phase (3A) happens to generate a sine wave signal containing an offset caused by a difference in amplitude existing between the output signal of the first means for sensing angular position (1A) and the output signal of the second means for sensing angular position (2A), an operational amplifier for erasing offset of A phase (31A) is employed for the purpose to erase the offset existing in the output signal of the A phase encoder. In other words, an adjuster means e.g. a volume resistor of the operational amplifier for erasing offset of A phase (31A) is adjusted to adjust the amplification factor of the operational amplifier for erasing offset of A phase (31A), resultantly causing the amplitude of the output signal of the first means for sensing angular position of A phase (1A) to become equal to the amplitude of the output signal of the second means for sensing angular position of A phase (2A).

Similar operation is conducted also for the B phase encoder which detects the angular position of a part whose angular position differs from that of the part of the same rotator whose angular position is detected by the A phase encoder, by 90 degrees in terms of phase. In other words, the output signals of a first means for sensing angular position of B phase (1B) and the output signals of a second means for sensing angular position of B phase (2B) are input to a sine wave generator means of B phase (3B), which subtracts the one of the two signals from the other of the two signals and generates a sine wave signal which represents the angular position of the rotator. If the sine wave generator means of B phase (3B) happens to generate a sine wave signal containing an offset caused by a difference in amplitude existing between the output signal of the first means for sensing angular position (1B) and the output signal of the second means for sensing angular position (2B), an operational amplifier for erasing offset of B phase (31B) is employed for the purpose to erase the offset existing in the output signal of the B phase encoder. In other words, an adjuster means e.g. a volume resister of the operational amplifier for erasing offset of B phase (31B) is adjusted to adjust the amplification factor of the operational amplifier for erasing offset of B phase (31B), resultantly causing the amplitude of the output signal of the first means for sensing angular position of B phase (1B) to become equal to the amplitude of the output signal of the second means for sensing angular position of B phase (2B).

If a difference in amplitude happens to exist between the output signal of the sine wave generator means of A phase (3A) and the output signal of the sine wave generator means of B phase (3B), an operational amplifier for erasing amplitude difference of A phase (32A) which is attached to the sine wave generator means of A phase (3A) or an operational amplifier for erasing amplitude difference of B phase (32B) which is attached to the sine wave generator means of B phase (3B) is employed for the purpose to make the amplitude of the sine wave output of the sine wave generator means of A phase (3A) equal to the amplitude of the sine wave output of the sine wave generator means of B phase (3B). In other words, an adjuster means e.g. a volume resistor of the foregoing operational amplifier (32A) or (32B) is adjusted to adjust the amplification factor of the foregoing operational amplifier (32A) or (32B), resultantly satisfying the above purpose.

If the difference in phase between the sine wave output signal of the sine wave generator means of A phase (3A) and the sine wave output signal of the sine wave generator means of B phase (3B) happens to differ from 90 degrees, either an operational amplifier for erasing phase difference error of A phase (33A) or an operational amplifier for erasing phase difference error of B phase (33B) is employed for the purpose to erase the error in phase difference. In other words, the output signal of either the operational amplifier for erasing phase difference error of A phase (33A) or the operational amplifier for erasing phase difference error of B phase (33B) is added to or subtracted from the output signal of the sine wave generator means of the other phase (3B) or (3A) respectively, to shift the phase, resultantly to erase the error in phase difference. In this case, adjustment of the output signal of the operational amplifier for erasing phase difference error of A phase (33A) or adjustment of the output signal of the operational amplifier for erasing phase difference error of B phase (33B) is generally conducted by adjusting the amplification factor respectively of the operational amplifier for erasing phase difference error of A phase (33A) or of the operational amplifier for erasing phase difference error of B phase (33B). The adjustment of the amplification factor is conducted by employing an adjuster means e.g. a volume resistor of the operational amplifier for erasing phase difference error of A phase (33A) or by employing an adjuster means e.g. a volume resistor of the operational amplifier for erasing phase difference error of B phase (33B).

The above description explains an optical encoder available in the prior art and which is employable for detecting the angular position of a rotator and which is designed to erase or correct various errors. The prior art embodiment corrects errors including a difference in amplitude which happens to exist between two signals which represent the angular position of the foregoing rotator and which have a difference in phase by 180 degrees or 90 degrees between each other, an error which happens to exist for the difference in phase which theoretically should be 90 degrees or 180 degrees, and/or an offset which happens to exist for the one or both signals described above. However, the correction of such errors is accomplished by adjusting the amplification factor of one or more operational amplifiers, such adjustment being conducted by adjusting one or more adjuster means e.g. one or more volume resistors attached to the foregoing one or more operational amplifiers. Since the foregoing adjustment is troublesome and requires a long time to conduct, and since the foregoing operational amplifiers accompanied by adjuster means, e.g. one or more volume resistors, requires a large space for installation, the optical encoder available in the prior art suffers drawbacks which are desirable to remove.

SUMMARY OF THE INVENTION

The object of this invention is to provide an encoder particularly an optical encoder which has various advantages including easy operation or handling, less space for installation, and the like.

The above described object can be achieved by any of the encoders in accordance with this invention elaborated below.

Figure 2:
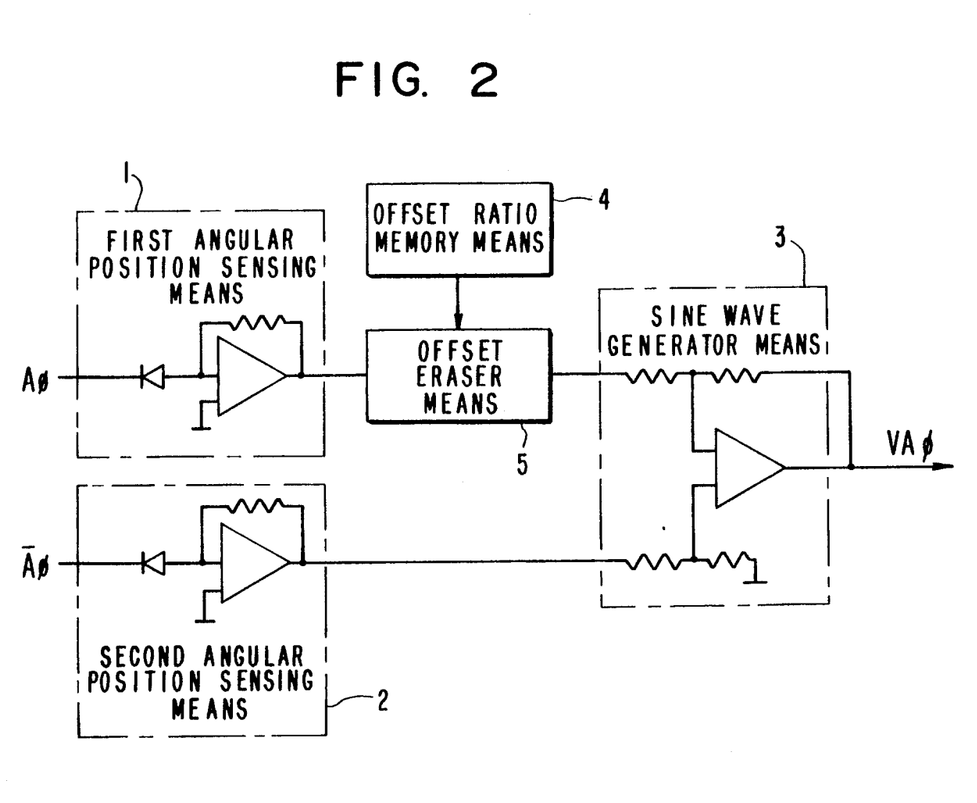
FIG. 2 is a schematic drawing of an encoder in accordance with the first embodiment of this invention.

A first encoder in accordance with this invention is provided with a means for erasing an offset caused by a difference in amplitude which may happen between two detected signals of which the phase differ 180 degrees from each other. As is illustrated in FIG. 2 which is the schematic drawing thereof, the first encoder in accordance with this invention is provided with a first angular position sensing means (1) for detecting the angular position of a rotator, and a second angular position sensing means (2) for detecting the angular position of the foregoing rotator. The angular position has an inverse phase with respect to the angular position which the foregoing first angular position sensing means (1) detects, and a sine wave generator means (3) for generating a sine wave signal by subtracting either one of the output signals of the foregoing first and second angular position sensing means (1) and (2), respectively, from the other one. The encoder is further provided with an offset ratio memory means (4) for memorizing the ratio of the average of the maximum value and the minimum value of the output signals which were in advance detected by the first angular position sensing means (1) and the average of the maximum value and the minimum value of the output signals which were in advance detected by the second angular position sensing means (2). The encoder is also provided with an offset eraser means (5) for erasing the offset by multiplying or dividing either the output signal detected by the foregoing first angular position sensing means (1) or the output signal detected by the foregoing second angular position sensing means (2) by the foregoing offset ratio memorized in the foregoing offset ratio memory means.

A table look-up system can be employed for implementing the foregoing offset ratio memory means (4). An amplification factor variable digital amplifier can be employed as the foregoing offset eraser means (5).

Figure 3:
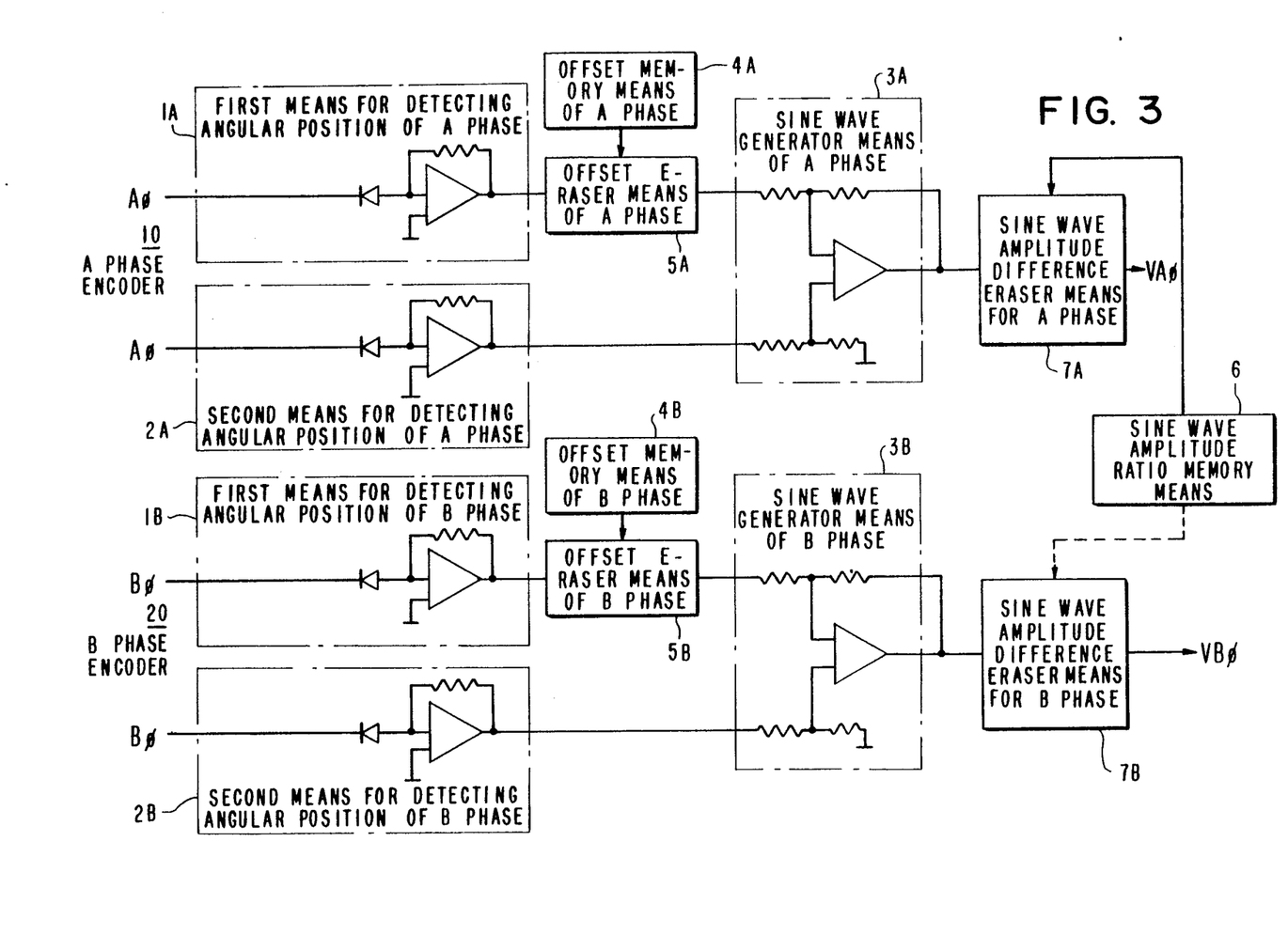
FIG. 3 is a schematic drawing of an encoder in accordance with the second embodiment of this invention.

A second encoder in accordance with this invention is provided with a means for erasing a difference in amplitude which may happen between A phase signal and B phase signal of which the phase differs from the phase of A phase signal by 90 degrees. As is illustrated in FIG. 3 which is the schematic drawing thereof, the second encoder in accordance with this invention is provided with an A phase encoder (10) substantially identical to the first encoder in accordance with this invention and a B phase encoder (20) for generating a sine wave signal having a phase different from the foregoing A phase encoder (10) by 90 degrees. The second encoder is further provided with a sine wave amplitude ratio memory means (6) for memorizing the ratio of the amplitude of the output signal of the A phase encoder (10) which was detected in advance and the amplitude of the output signal of the B phase encoder (20) which was detected in advance. A sine wave amplitude difference eraser means for A phase (7A) and/or a sine wave amplitude difference eraser means for B phase (7B) for erasing the difference in amplitude of the foregoing sine wave output signals. These sine wave amplitude difference removing means for the A or B phase (7A) or (7B) operate by multiplying or dividing at least one of the output signals of the foregoing A phase encoder (10) and the foregoing B phase encoder (20) by the foregoing ratio of the amplitude of the output signal of the A phase encoder (10) and the amplitude of the output signal of the B phase encoder (20) memorized in the foregoing sine wave amplitude ratio memory means (6).

A table look-up system can be employed for implementing the foregoing sine wave amplitude ratio memory means (6). An amplification factor variable digital amplifier can be employed as the foregoing sine wave amplitude difference eraser means for A phase (7A) and as the foregoing sine wave amplitude difference eraser means for B phase (7B).

Figure 4:
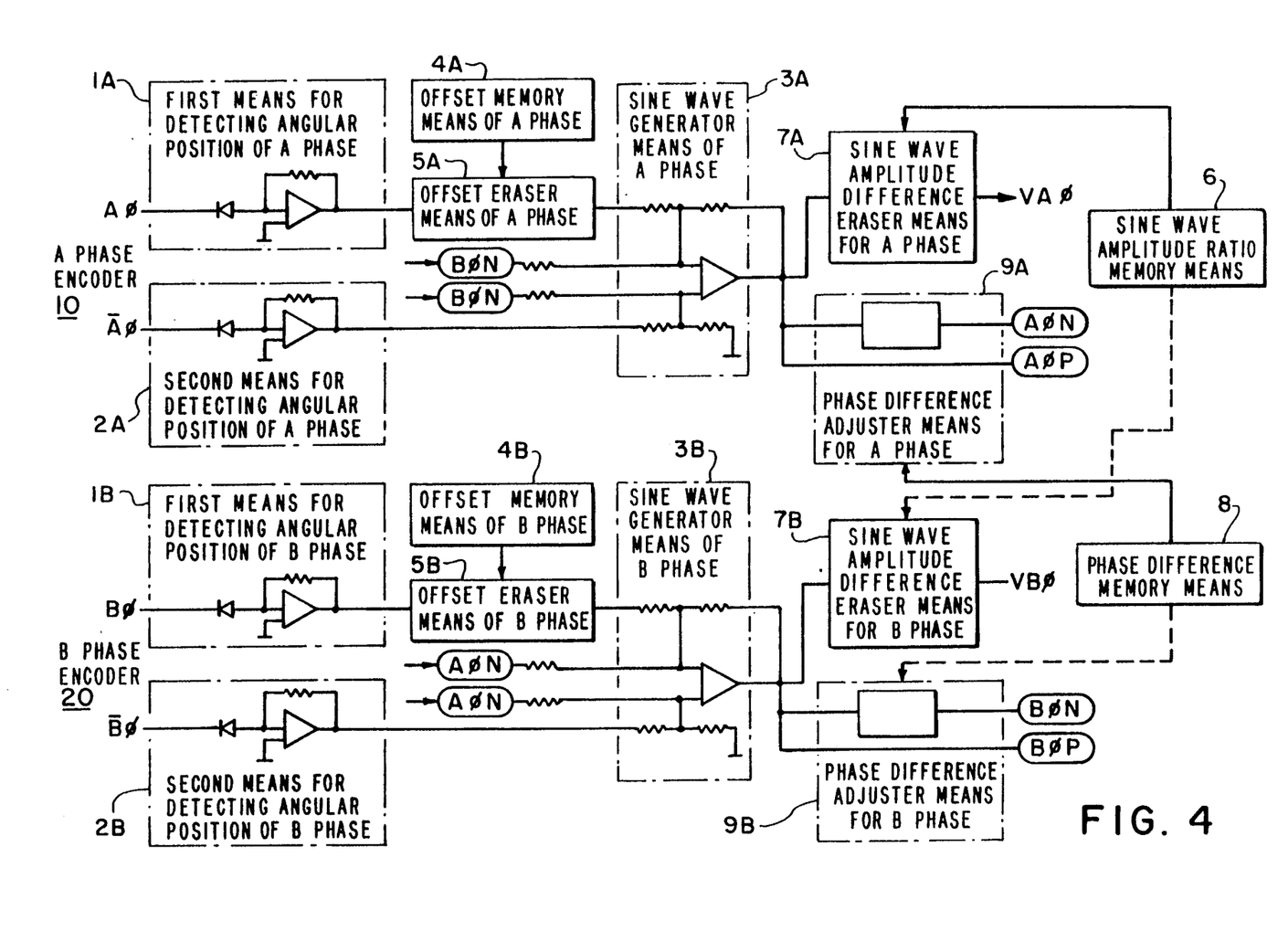
FIG. 4 is a schematic drawing of an encoder in accordance with the third embodiment of this invention.

A third encoder in accordance with this invention is provided with a means for adjusting a difference in phase which exists between the A phase signal and the B phase signal and which should be 90 degrees. As is illustrated in FIG. 4 which is the schematic drawing thereof, the third encoder in accordance with this invention is an encoder identical to the second encoder in accordance with this invention, wherein the encoder is further provided with a phase difference memory means (8) for memorizing the phase difference between the phase of the output signal of the A phase encoder (10) which was in advance detected and a phase which differs from the phase of the output signal of the B phase encoder (20) of which the phase should differ from the phase of the output signal of the A phase encoder (10). The third encoder also has a phase difference adjuster means for A phase (9A) and/or a phase difference adjuster means for B phase (9B) for adjusting the foregoing phase difference to approximately 90 degrees by multiplying or dividing either the output signal of the sine wave generator means (3A) of the A phase encoder (10) or the output signal of the sine wave generator means (3B) of the B phase encoder (20) by a coefficient obtained from the phase difference memorized in the foregoing phase difference memory means (8) and by adding the product or the quotient to or subtracting the product or the quotient from respectively either the output signal of the sine wave generator means (3B) of the B phase encoder (20) or the output signal of the sine wave generator means (3A) of the A phase encoder (10).

A table look-up system can be employed for implementing the foregoing phase difference memory means (8). An amplification factor variable digital amplifier can be employed as the foregoing phase difference adjuster means for A phase (9A) and as the foregoing phase difference adjuster means for B phase (9B).

Figure 5:
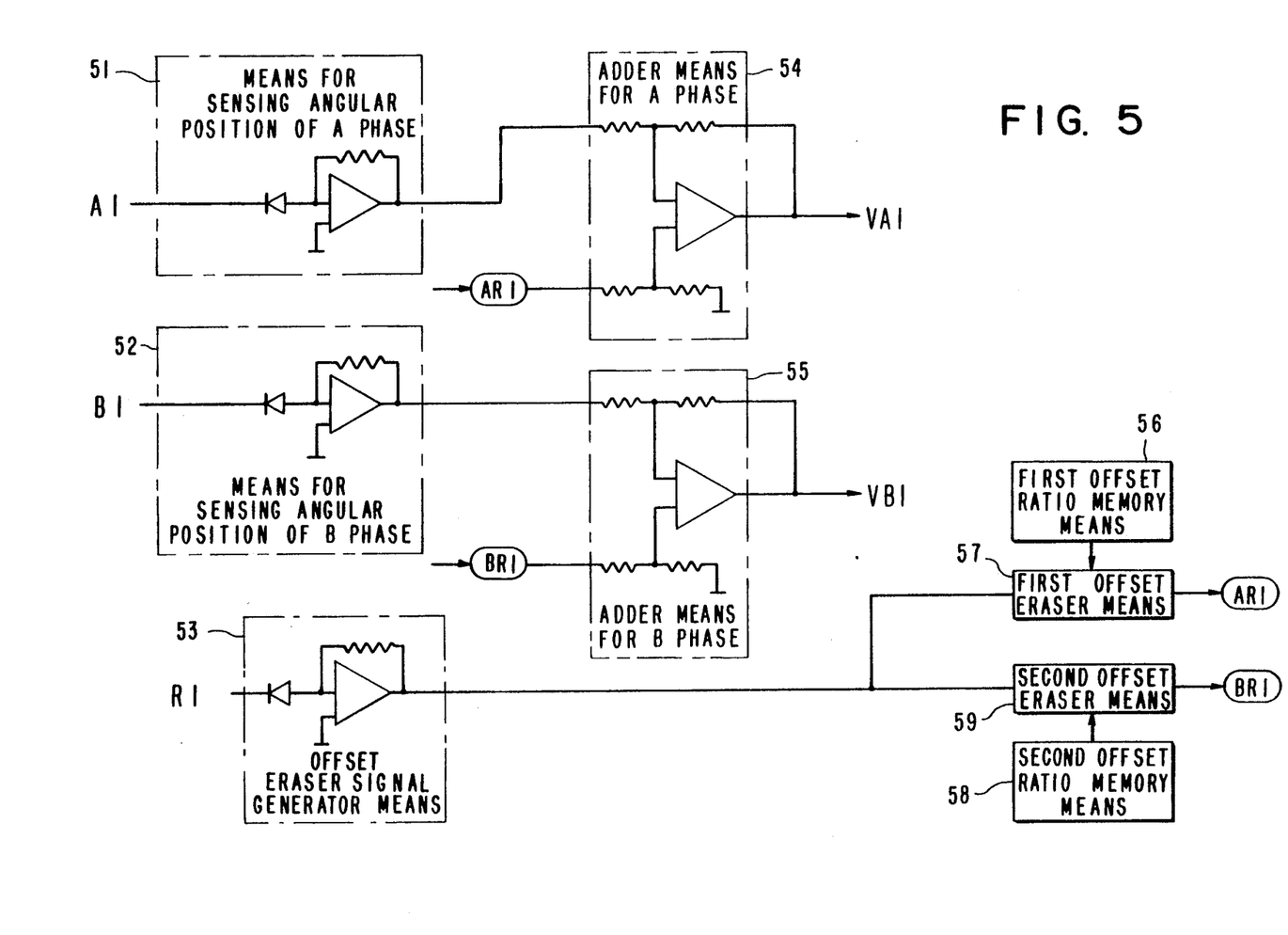
FIG. 5 is a schematic drawing of an encoder in accordance with the fourth embodiment of this invention.

A fourth encoder in accordance with this invention is an encoder provided with a means for sensing angular position of A phase, a means for sensing angular position of B phase, and an offset eraser signal generator means. The fourth encoder is provided with a means for erasing an offset which may happen between the offset eraser signal and either of the output signals of the means for sensing angular position of A phase and of the means for sensing angular position of B phase. As is illustrated in FIG. 5 which is the schematic drawing thereof, the fourth encoder in accordance with this invention is an encoder provided with a means for sensing angular position of A phase (51), a means for sensing angular position of B phase (52) of which the phase differs from the A phase by 90 degrees and an offset eraser signal generator means (53). The encoder is further provided with a first offset ratio memory means (56) for memorizing the ratio of the offset of the output signal of the means for sensing angular position of A phase (51) which was in advance detected and the offset of the output signal of the offset eraser signal generator means (53) which was in advance detected. A first offset eraser means (57) for erasing the foregoing offset operates by causing an adder (subtracter) means for A phase (54) to multiply or divide the output signal of the foregoing means for sensing angular position of A phase (51) by the foregoing offset ratio which was detected in advance and which is memorized in the foregoing first offset ratio memory means (56). The first offset eraser means (57) also causes the adder means for the A phase (54) to subtract the product or quotient from the output signal of the foregoing means for sensing angular position of A phase (51). A second offset ratio memory means (58) for memorizing the ratio of the offset of the output signal of the means for sensing angular position of B phase (52) which was in advance detected and the offset of the output signal of the offset eraser signal generator means (53) which was in advance detected, a second offset eraser means (59) for erasing the foregoing offset by causing an adder (subtracter) means for B phase (55) to multiply or divide the output signal of the foregoing means for sensing angular position of B phase (52) by the foregoing offset ratio which was detected in advance and is memorized in the foregoing second offset ratio memory means (58). The second offset eraser means (59) further causes the adder means for B phase to subtract the product or quotient from the output signal of the foregoing means for sensing angular position of B phase (52).

A table look-up system can be employed for implementing the foregoing first offset ratio memory means (56) and the foregoing second offset ratio memory means (58). An amplification factor variable digital amplifier can be employed as the foregoing first offset eraser means (57) and as the foregoing second offset eraser means (59).

Figure 6:
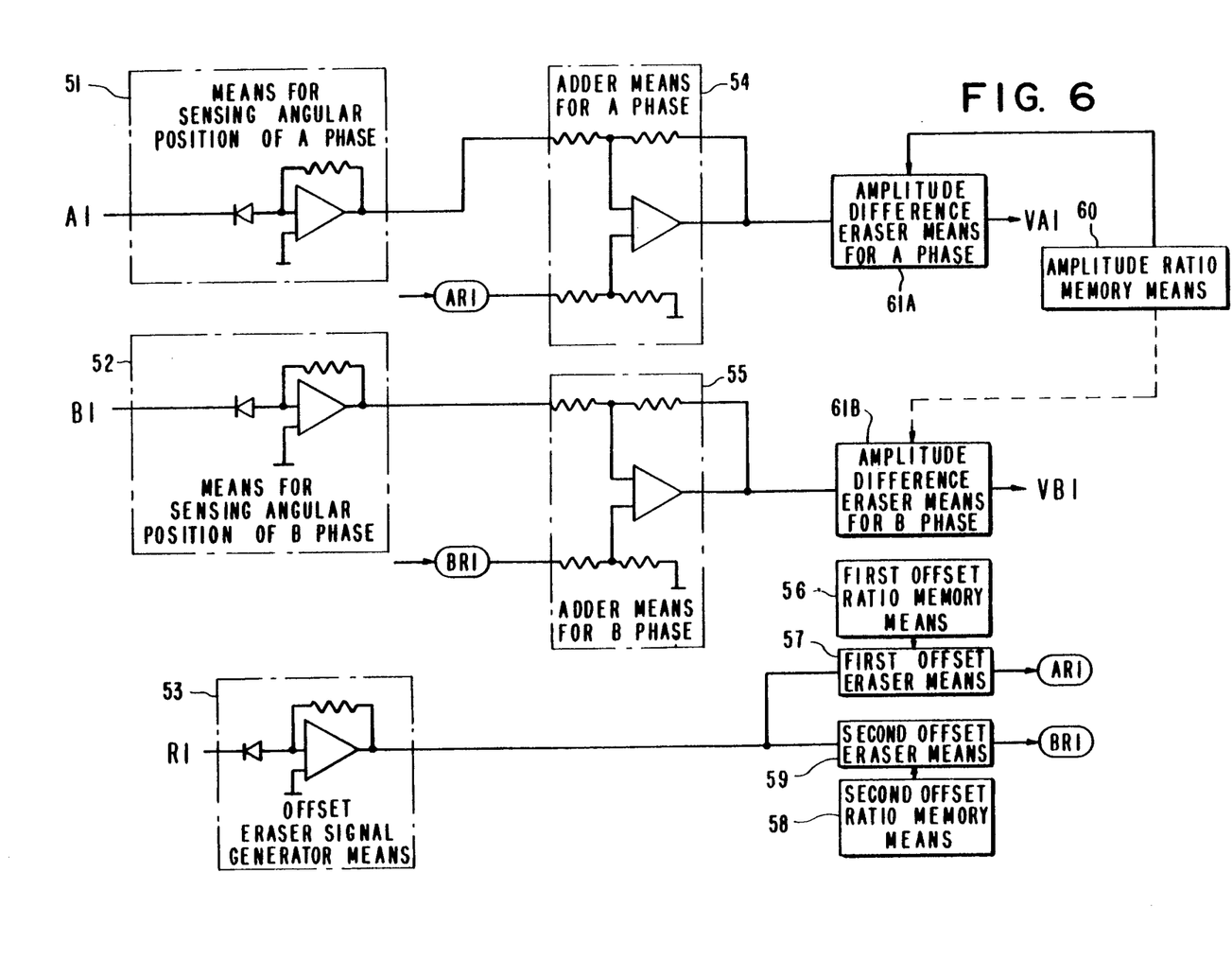
FIG. 6 is a schematic drawing of an encoder in accordance with the fifth embodiment of this invention.

A fifth encoder in accordance with this invention is an encoder identical to the fourth encoder in accordance with this invention, further provided with a means for erasing a difference in amplitude which may happen between either the output signal of A phase or of B phase encoder and the offset eraser signal. As is illustrated in FIG. 6 which is the schematic drawing thereof, the fifth encoder in accordance with this invention is an encoder identical to the fourth encoder in accordance with this invention, wherein the encoder is further provided with an amplitude ratio memory means (60) for memorizing the ratio of the amplitude of the output signal of the adder (subtracter) means for A phase (54) which was in advance detected and the amplitude of the output signal of the adder (subtracter) means for B phase (55). The fifth encoder is also provided with amplitude difference eraser means for A phase (61A) and/or an amplitude difference eraser means for B phase (61B) for multiplying or dividing at least one of the output signals of the foregoing adder (subtracter) means for A phase (54) and the foregoing adder (subtracter) means for B phase (55) by the amplitude ratio memorized in the amplitude ratio memory means (60).

A table look-up system can be employed for implementing the foregoing amplitude ratio memory means (60). An amplification factor variable digital amplifier can be employed as the foregoing amplitude difference eraser means for A phase (61A) and as the foregoing amplitude difference eraser means for B phase (61B).

Figure 7:
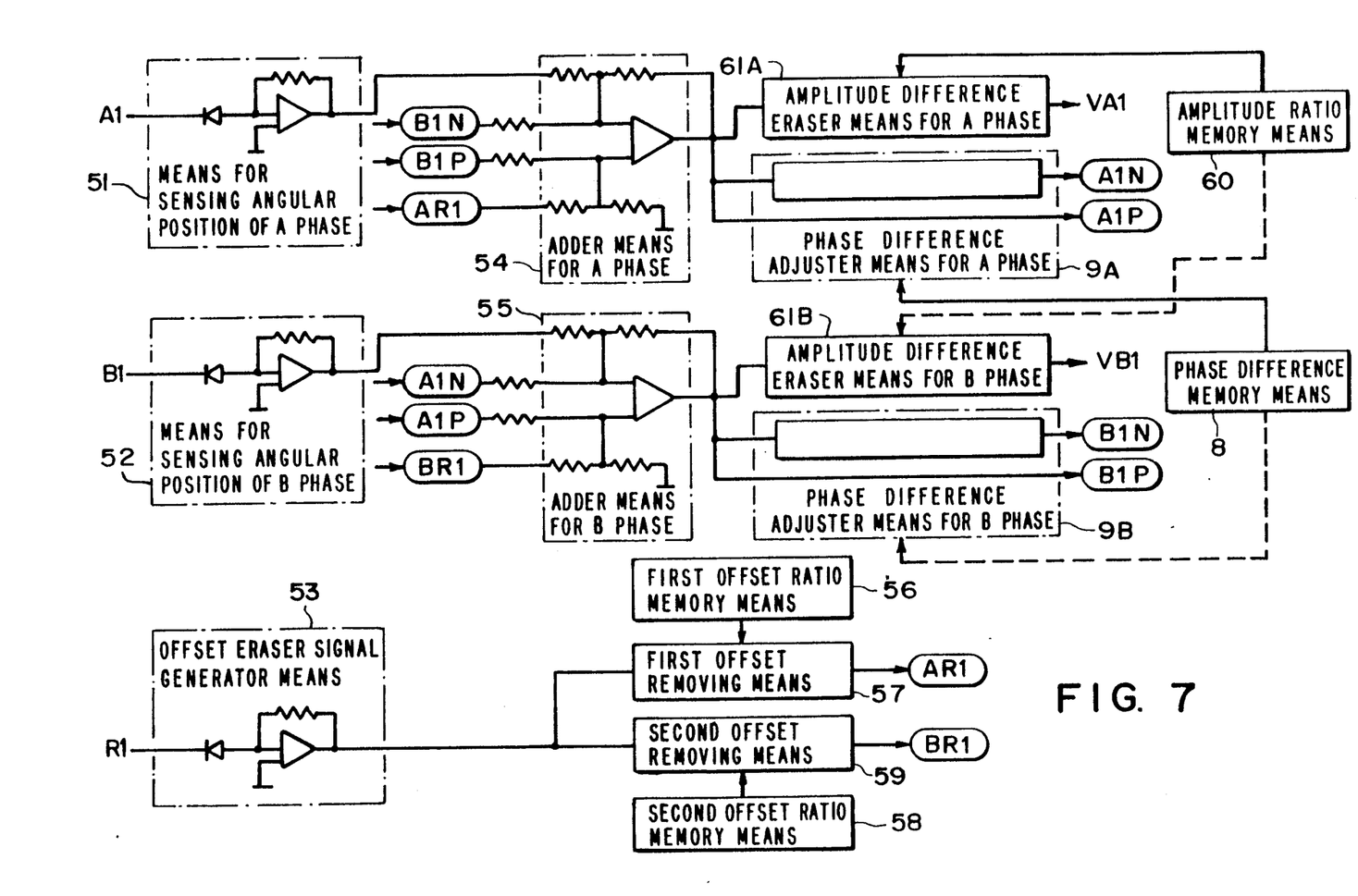
FIG. 7 is a schematic drawing of an encoder in accordance with the sixth embodiment of this invention.

A sixth encoder in accordance with this invention is an encoder identical to the fifth encoder in accordance with this invention, further provided with a means for adjusting a difference in phase existing between either the output signal of A phase or of B phase and the offset eraser signal to approximately 90 degrees. As is illustrated in FIG. 7 which is the schematic drawing thereof, the sixth encoder in accordance with this invention is an encoder identical to the fifth encoder in accordance with this invention, wherein the encoder is further provided with a phase difference memory means (8) for memorizing the phase difference between the phase of the output signal of the adder (subtracter) means for A phase (54) which was in advance detected and a phase which differs by 90 degrees from the output signal of the adder (subtracter) means for B phase (55) of which the phase differs from the phase of the output signal of the adder (subtracter) means for A phase (54). The sixth encoder of the present invention is also provided with a phase difference adjuster means for A phase (9A) and/or a phase difference adjuster means for B phase (9B) for adjusting the foregoing phase difference to approximately 90 degrees by multiplying or dividing either the output signal of the adder (subtracter) means for A phase (54) or the output signal of the adder (subtracter) means for B phase (55) by a coefficient obtained from the phase difference memorized in the foregoing phase difference memory means (8). The phase difference adjuster means for either or both of the A or B phase also corrects the foregoing phase difference by adding the product or the quotient to or subtracting the product or the quotient from, respectively, either the output signal of the adder (subtracter) means for B phase (55) or the output signal of the adder (subtracter) means for A phase (54).

A table look-up system can be employed for implementing the foregoing phase difference memory means (8). An amplification factor variable digital amplifier can be employed as the foregoing phase difference adjuster means for A phase (9A) and as the foregoing phase difference adjuster means for B phase (9B).

The philosophy which each embodiment of the present inventions is commonly based on, will be summarized below.

For each model, a mother table indicating the relations between the offset, the amplitude difference or the phase difference and the value required for correcting the errors of angular position caused respectively by either of the aforementioned various parameters is prepared.

When each encoder is finished, it is individually examined. If any offset, amplitude difference or phase difference happens to exist in the various detected signals for obtaining the angular position of a rotator, the corresponding value required for correcting the errors imposed on the output angular position of the rotator caused by the offset, the amplitude difference or the phase difference is input to the offset ratio memory means, the sine wave amplitude ratio memory means, the phase difference memory means and/or the phase difference memory means, each of which actually is a daughter table of the foregoing mother table. Whenever each encoder is employed, each value required for correcting the errors to be caused by the offset, the amplitude difference or the phase difference is read out of the offset ratio memory means, the sine wave amplitude ratio memory means, and/or the phase difference memory means. These digital values are given to the offset eraser means, the amplitude difference eraser means and/or the phase difference adjuster means, each of which is made of an amplification factor variable digital amplifier, resultantly correcting the error imposed on the output angular position of the encoder in accordance with this invention caused by offset, amplitude difference and/or phase difference.

BRIEF DESCRIPTION OF THE DRAWINGS

Referring to drawings tabulated below, a detailed description will be presented below for encoders in accordance with six independent embodiments of this invention.

DESCRIPTION OF PREFERRED EMBODIMENTS

First Embodiment

Encoder Provided With a Means for Erasing an Offset Caused by a Difference in Amplitude Between Two Detected Signals of Which the Phase Differs 180 Degrees from Each Other Referring to FIG. 2, the numeral (1) indicates a first angular position sensing means for detecting the angular position of a rotator, the numeral (2) indicates a second angular position sensing means for detecting the angular position of the foregoing rotator, such an angular position having the inverse phase with respect to the foregoing first angular position sensing means (1). The numeral (3) indicates a sine wave generator means for generating a sine wave signal representing the angular position of the foregoing rotator, such a sine wave signal being generated by subtracting either one of the output signals of the foregoing first and second angular position sensing means (1) and (2) from the remaining one of the foregoing output signals of the foregoing first and second angular position sensing means (1) and (2). The numeral (4) indicates an offset ratio memory means for memorizing the ratio of the average of the maximum value and the minimum value of the output signals of the first angular position sensing means (1) which output signals were in advance detected. The offset ration memory means (4) also memorizes the average of the maximum value and the minimum value of the output signals of the second angular position sensing means (2) which output signals were in advance detected. The numeral (5) indicates an offset erase means for erasing the offset by multiplying or dividing either the output signal detected by the foregoing first angular position sensing means (1) or the output signal detected by the second angular position sensing means (2) by the foregoing offset ratio memorized in the foregoing offset ratio memory means (4).

A table look-up system can be employed for implementing the foregoing offset ratio memory means (4). An amplification factor variable digital amplifier can be employed as the foregoing offset eraser means (5).

A preferable value desirable for correction of an error imposed on an output angular position of a rotator caused by an offset (the ratio of the average of the maximum value and the minimum value of the output signals of the foregoing first angular position sensing means (1) and the average of the maximum value and the minimum value of the output signal of the foregoing second angular position sensing means (2)) is predetermined for each encoder model. A mother table indicating the relations between the foregoing offset and the corresponding preferable correction amount is prepared to use it for implementing a table look-up system for erasing the offset described above.

After each encoder is finished, it is individually examined. If an offset happens to exist in the detected signal thereof, the value of the offset is input into the foregoing table to read the preferable correction amount corresponding to the offset in terms of digital value, out of the table to be input into the offset ratio memory means (4) which is a daughter table of the foregoing mother table. When each encoder is employed, the correction amount memorized in the offset ratio memory means (4) is input into the offset eraser means (5) which actually is an amplification factor variable digital amplifier, resultantly erasing the offset caused by the difference in amplitude between the two detected signals of which the phase differs 180 degrees from each other, for the ultimate purpose to allow the encoder of the first embodiment of this invention to output a correct angular position of the rotator.

Second Embodiment

Encoder Provided With a Means for Erasing a Difference in Amplitude Existing Between A Phase Signal and B Phase Signal of Which the Phase Differs from Each Other by 90 Degrees Referring to FIG. 3, the numeral (10) indicates an A phase encoder which is identical to the encoder of the foregoing first embodiment of this invention, and the numeral (20) indicates a B phase encoder which is identical to the A phase encoder but which outputs a sine wave signal having a phase different from the foregoing A phase encoder (10) by 90 degrees. The numeral (6)

indicates a sine wave amplitude ratio memory means for memorizing the ratio of the amplitude of the output signal of the A phase encoder (10) which was detected in advance and the amplitude of the output signal of the B phase encoder (20) which was detected in advance. The numeral (7A) indicates a sine wave amplitude difference eraser means for A phase for erasing the difference in amplitude of the foregoing sine wave signal of A phase by multiplying or dividing the foregoing output signal of the foregoing A phase encoder (10) by the ratio of the amplitude of the output signal of the A phase encoder (10) and the amplitude of the output signal of the B phase encoder (20). The numeral (7B) indicates a sine wave amplitude difference eraser means for B phase for erasing the difference in amplitude of the foregoing sine wave signal of B phase by multiplying or dividing the foregoing output signal of the foregoing B phase encoder (20) by the ratio of the amplitude of the output signal of the A phase encoder (10) and the amplitude of the output signal of the B phase encoder (20).

A table look-up system can be employed for implementing the foregoing sine wave amplitude ratio memory means (6). An amplification factor variable digital amplifier can be employed as the foregoing sine wave amplitude difference eraser means for A phase (7A) and as the foregoing sine wave amplitude difference eraser means for B phase (7B).

A preferable value desirable for correction of an error imposed on an output angular position of a rotator caused by an amplitude difference or an imbalance existing between the amplitude detected by the A phase encoder (10) and the amplitude detected by the B phase encoder (20) is predetermined for each encoder model, and a mother table indicating the relations between the foregoing amplitude difference and the corresponding preferable correction amount is prepared to use it for implementing a table lookup system for erasing the offset described above.

After each encoder is finished, it is individually examined. If an amplitude difference happens to exist in the detected signal thereof, the value of the amplitude difference is input into the foregoing table to read the preferable correction amount corresponding to the offset in terms of digital value out of the table, to be input into the sine wave amplitude ratio memory means (6) which is a daughter table of the foregoing mother table. When each encoder is employed, the correction amount memorized in the amplitude ratio memory means (6) is input into the sine wave amplitude difference eraser means for A phase (7A) and/or the sine wave amplitude difference eraser means for B phase (7B) each of which actually is an amplification factor variable digital amplifier. The sine wave amplitude difference removing means for the A or B phase (7A) or (7B) then aid in erasing the amplitude difference between the A phase signal and the B phase signal, for the ultimate purpose to allow the encoder of the second embodiment of this invention to output a correct angular position of the rotator.

Third Embodiment

Encoder Provided With a Means for Adjusting a Difference in Phase Existing Between A Phase Signal and B Phase Signal of Which the Phase Differs from Each Other by 90 Degrees Referring to FIG. 4, an encoder in accordance with the third embodiment of this invention is an encoder in accordance with the second embodiment of this invention further provided with the members tabulated below.

The numeral (8) indicates a phase difference memory means for memorizing the phase difference between the phase of the output signal of the A phase encoder (10) which was in advance detected and the phase which differs from the phase of the output signal of the B phase encoder (20) which was in advance detected. The numeral (9A) indicates a phase difference adjuster means for the A phase for adjusting the foregoing phase difference to approximately 90 degrees by multiplying or dividing the output signal of the sine wave signal generator means (3A) of the foregoing A phase encoder (10) by a coefficient obtained from the phase difference memorized in the foregoing phase difference memory means (8) and by adding the product or the quotient to or by subtracting the product or the quotient from the output signal of the sine wave generator means (3B) of the B phase encoder (20). The numeral (9B) indicates a phase difference adjuster means for the B phase for adjusting the foregoing phase difference to approximately 90 degrees by multiplying or dividing the output signal of the sine wave signal generator means (3B) of the foregoing B phase encoder (20) by a coefficient obtained from the phase difference memorized in the foregoing phase difference memory means (8) and by adding the product or the quotient to or by subtracting the product or the quotient from the output signal of the sine wave generator means (3A) of the A phase encoder (10).

A table look-up system can be employed for implementing the foregoing phase difference memory means (8). An amplification factor variable digital amplifier can be employed as the foregoing phase difference adjuster means for A phase (9A) and the foregoing phase difference adjuster means for B phase (9B).

A preferable value desirable for adjusting the phase difference between the output signal of the A phase encoder (10) and the output signal of the B phase encoder (20) to approximately 90 degrees is predetermined for each encoder model. Using these values, a mother table indicating the relations between the detected phase difference between the output signal of the A phase encoder (10) and the output signal of the B phase encoder (20) and the corresponding preferable value for adjusting the foregoing phase difference to approximately 90 degrees is prepared to use it for implementing a table look-up system for adjusting the phase difference to approximately 90 degrees.

After each encoder is finished, it is individually examined. If the phase difference between the output signal of the A phase encoder (10) and the output signal of the B phase encoder (20) happens to differ from 90 degrees, the actual phase difference is input into the foregoing table to read the preferable phase difference adjusting amount corresponding to the actual phase difference in terms of digital value out of the table, to be input into the phase difference memory means (8) which is a daughter table of the foregoing mother table. When each encoder is employed, the phase difference adjusting amount memorized in the phase difference memory means (8) is input into the phase difference adjuster means for A phase (9A) or the phase difference adjuster means for B phase (9B) which actually is an amplification factor variable digital amplifier, resultantly adjusting phase difference between the output signal of the A phase encoder (10) and the output signal of the B phase encoder (20) to approximately 90 degrees, for the ultimate purpose to allow the encoder of the third embodiment of this invention to output a correct angular position of the rotator.

Fourth Embodiment

Encoder Provided With a Means for Erasing an Offset Existing Between Each of the Output Signals of A Phase and B Phase Encoders and Offset Eraser Signal Referring to FIG. 5, the numeral (51) indicates a means for detecting angular position of the A phase, and the numeral (52) indicates a means for detecting angular position of the B phase of which the phase differs from that of the A phase by 90 degrees. The numeral (53) indicates an offset eraser signal generator means. The numeral (56) indicates a first offset ratio memory means for memorizing the ratio of the offset of the output signal of the means for sensing angular position of A phase (51) which was in advance detected and the offset of the output signal of the offset eraser signal generator means (53) which was in advance detected. The numeral (57) indicates a first offset eraser means for erasing the foregoing offset by causing an adder (subtracter) means for A phase (54) to multiply or divide the output signal of the foregoing means for sensing angular position of A phase (51) by the foregoing offset ratio which was detected in advance and is memorized in the foregoing first offset ratio memory means (56) and to subtract the product or quotient from the output signal of the foregoing means for sensing angular position of A phase (51). The numeral (58) indicates a second offset ratio memory means for memorizing the ratio of the offset of the output signal of the means for sensing angular position of B phase (52) which was in advance detected and the offset of the output signal of the offset eraser signal generator means (53) which was in advance detected. The numeral (59) indicates a second offset eraser means for erasing the foregoing offset by causing an adder (subtracter) means for B phase (55) to multiply or divide the output signal of the foregoing means for sensing angular position of B phase (52) by the foregoing offset ratio which was detected in advance and is memorized in the foregoing second offset ratio memory means (58) and to subtract the product or quotient from the output signal of the foregoing means for sensing angular position of B phase (52).

A table look-up system can be employed for implementing the foregoing first offset ratio memory means (56) and the foregoing second offset ratio memory means (58). An amplification factor variable digital amplifier can be employed as the foregoing first offset ratio eraser means (57) and the foregoing second offset ratio eraser means (59).

A preferable value desirable for erasing an offset between the output signal of the means for sensing angular position of A phase (51) and the output signal of the offset eraser signal generator means (53) and a preferable value desirable for erasing an offset between the output signal of the means for sensing angular position of B phase (52) and the output signal of the offset eraser signal generator means (53) is predetermined for each encoder model, and a mother table indicating the relations between each of the foregoing offsets and the corresponding preferable offset erasing amount is prepared to use it for implementing a table look-up system for erasing the offset described above.

After each encoder is finished, it is individually examined. If the foregoing offsets happen to exist in the detected output signals, each of the value of the offsets is input into the foregoing table to read the preferable offset erasing amount corresponding to the offsets in terms of digital value out of the table, to be input respectively into the first offset ratio memory means (56) and the second offset ratio memory means (58) each of which is a daughter table of the foregoing mother table. When each encoder is employed, the offset erasing amount memorized in either the first offset ratio memory means (56) or the second offset ratio memory means (58), is input into respectively either the first offset eraser means (57) or the second offset eraser means (59) each of which actually is an amplification factor variable digital amplifier, resultantly erasing the offset between the output signal of the means for sensing angular position of A phase (51) and the output signal of the offset eraser signal generator means (53) and the offset between the output signal of the means for sensing angular position of B phase (52) and the output signal of the offset eraser signal generator means (53), for the altimate purpose to allow the encoder of the fourth embodiment of this invention to output a correct angular position of the rotator.

Fifth Embodiment

Encoder Provided With a Means for Erasing Amplitude Difference Between Either A Phase Output Signal or B Phase Output Signal and the Offset Eraser Signal Referring to FIG. 6, an encoder in accordance with the fifth embodiment of this invention is an encoder in accordance with the fourth embodiment of this invention further provided with the members tabulated below.

The numeral (60) indicates an amplitude ratio memory means for memorizing the ratio of the amplitude of the output signal of the adder (subtracter) means for A phase (54) which was in advance detected and the amplitude of the output signal of the adder (subtracter) means for B phase (55). The numeral (61A) indicates an amplitude difference eraser means for A phase for erasing a difference in the foregoing two amplitudes by multiplying or dividing the output signal of the foregoing adder (subtracter) means for A phase (54) by the amplitude ratio memorized in the amplitude ratio memory means (60). The numeral (61B) indicates an amplitude difference eraser means for B phase for erasing a difference in the foregoing two amplitudes by multiplying or dividing the output signal of the foregoing adder (subtracter) means for B phase (55) by the amplitude ratio memorized in the amplitude ratio memory means (60).

A table look-up system can be employed for implementing the foregoing amplitude ratio memory means (60). An amplification factor variable digital amplifier can be employed as the foregoing amplitude difference eraser means for A phase (61A) and the foregoing amplitude difference eraser means for B phase (61B).

A preferable value desirable for erasing amplitude difference between the output signal of the adder (subtracter) means for A phase (54) and the offset eraser signal or the output signal of the adder (subtracter) means for B phase (55) and the offset eraser signal is predetermined for each encoder model. Using these values a mother table indicating the relations between the foregoing amplitude difference between the output signal of the adder (subtracter) means for A phase (54) and the offset eraser signal or the output signal of the adder (subtracter) means for B phase (55) and the offset eraser signal and the corresponding preferable amplitude difference erasing amount is prepared to use it for implementing a table lookup system for erasing the foregoing amplitude difference described above.

After each encoder is finished, it is individually examined. If the foregoing amplitude difference happens to exist in the detected output signals, the detected amplitude difference is input into the foregoing table to read the foregoing corresponding preferable amplitude difference erasing amount in terms of digital value out of the table, to be input in the amplitude ratio memory means (60). When each encoder is employed, the foregoing preferable amplitude difference erasing amount is input to either the amplitude difference eraser means for A phase (61A) or the amplitude difference eraser means for B phase (61B) each of which actually is an amplification factor variable digital amplifier, resultantly erasing the amplitude difference between the output signal of the adder (subtracter) means for A phase (54) and the offset eraser signal or the output signal of the adder (subtracter) means for B phase (55) and the offset eraser signal.

Sixth Embodiment

Encoder Provided With a Means for Adjusting a Difference in Phase Existing Between A Phase Signal or B Phase Signal and Offset Eraser Signal Referring to FIG. 7, an encoder in accordance with the sixth embodiment of this invention is an encoder in accordance with the fifth embodiment of this invention further provided with the members tabulated below.

The numeral (8) indicates a phase difference memory means for memorizing the phase difference between the phase of the output signal of the adder (subtracter) means for A phase (54) which was in advance detected and a phase which differs by 90 degrees from the output signal of the adder (subtracter) means for B phase (55). The numeral (9A) indicates a phase difference adjuster means for A phase for adjusting the foregoing phase difference to approximately 90 degrees by multiplying or dividing the output signal of the adder (subtracter) means of A phase (54) by a coefficient obtained from the phase difference memorized in the foregoing phase difference memory means (8) and by adding the product or the quotient to or subtracting from the output signal of the adder (subtracter) means for B phase (55). The numeral (9B) indicates a phase difference adjuster means for B phase for adjusting the foregoing phase difference to approximately 90 degrees by multiplying or dividing the output signal of the adder (subtracter) means for B phase (55) by a coefficient obtained from the phase difference memorized in the foregoing phase difference memory means (8) and by adding the product or the quotient to or subtracting the product or the quotient from the output signal of the adder (subtracter) means for A phase (54).

A table look-up system can be employed for implementing the foregoing phase difference memory means (8). An amplification factor variable digital amplifier can be employed as the foregoing phase difference memory means for A phase (9A) and the foregoing phase difference memory means for B phase (9B).

A preferable value desirable for adjusting the phase difference between the output signal of the adder (subtracter) means for A phase (54) and the offset eraser signal or the output signal of the adder (subtracter) means for B phase (55) and the offset eraser signal to approximately 90 degrees is predetermined for each encoder model. Using these values, a mother table indicating the relations between the detected phase difference between the output signal of the adder (subtracter) means for A phase (54) and the offset eraser signal and/or the output signal of the adder (subtracter) means for B phase (55) and the offset eraser signal and the corresponding preferable value for adjusting the foregoing phase difference to approximately 90 degrees is prepared to use it for implementing a table look-up system for adjusting the phase difference to approximately 90 degrees.

After each encoder is finished, it is individually examined. If the phase difference between the output signal of the adder (subtracter) means for A phase (54) and the offset eraser signal or the output signal of the adder (subtracter) means for B phase (55) and the offset eraser signal happens to differ from 90 degrees, the actual phase difference is input into the foregoing table to read the phase difference adjusting amount corresponding to the actual phase difference in terms of digital value out of the table to be input into the phase difference memory means (8) which is a daughter table of the foregoing mother table.

When each encoder is employed, the phase difference adjusting amount memorized in the phase difference memory means (8) is input into the phase difference adjuster means for A phase (9A) or the phase difference adjuster means for B phase (9B) which actually is an amplification factor variable digital amplifier, resultantly adjusting the phase difference between the output signal of the adder (subtracter) means for A phase (54) and the offset eraser signal or the output signal of the adder (subtracter) means for B phase (55) and the offset eraser signal to approximately 90 degrees, for the ultimate purpose to allow the encoder of the third embodiment of this invention to output a correct angular position of the rotator.

The foregoing description has clarified that this invention successfully provided a plurality of encoders each of which is provided with a table showing the relations between an offset, a difference in amplitude or a difference in phase and the corresponding value desirable for erasing errors to be caused thereby or for adjusting some of them, such values being predetermined for each encoder model, or with an offset memory means, an amplitude difference memory means and/or a phase difference memory means which memorize at least a part of the information memorized in the foregoing table, such a memorized piece of information being selected for each encoder. With one or more offset eraser means, one or more amplitude difference eraser means, and one or more phase difference adjuster means, such means being allowed to conduct correction and/or adjustment of one or more foregoing detected output signals, based on the information memorized in and picked up from the foregoing various memory means, each of the encoders in accordance with this invention outputs one or more correct signals, regardless of existence of one or more offsets, one or more amplitude differences, and/or one or more phase differences on a plurality of output signals which differ from one another by 90 degrees or 180 degrees.

What is claimed is:

1. An encoder for a rotator comprising:
first angular position sensing means for generating a first angular position signal relating to a first angular position of the rotator;
second angular position sensing means for generating a second angular position signal relating to a second angular position of the rotator, the second angular position signal having an inverse phase with respect to the first angular position;
sine wave generator means for generating a sine wave signal by subtracting the first and second angular position signals;
offset ratio memory means for memorizing a ratio of an average of a maximum value and a minimum value of the first angular position signal and an average of a maximum value and a minimum valve of the second angular position signal; and
offset eraser means for erasing an offset by operating on at least one of the first angular position signal and the second angular position signal with the offset ratio.

2. An encoder in accordance with claim 1, wherein
said offset ratio memory means includes a table look-up system, and wherein
said offset eraser means includes an amplification factor variable digital amplifier.

3. An encoder system for a rotator, comprising:
an A phase encoder including first angular position sensing means for detecting a first angular position of the rotator to generate a first angular position signal, second angular position sensing means for detecting a second angular position of the rotator to generate a second angular position signal, sine wave generator means for generating a first sine wave signal by subtracting the first and second angular position signals, first offset ratio memory means for memorizing a first offset ratio of an average of a maximum value and a minimum value of the first angular position signal and an average of a maximum value and a minimum value of the second angular position signal, and first offset eraser means for erasing a first offset by operating on at least one of the first angular position signal and the second angular position signal with the first offset ratio;
a B phase encoder including third angular position sensing means for detecting a third angular position of the rotator to generator a third angular position signal, fourth angular position sensing means for detecting a fourth angular position of the rotator to generate a fourth angular position signal, sine wave generator means for generating a second sine wave signal by subtracting the third and fourth angular position signal, second offset ration memory means for memorizing a second offset ratio of an average of a maximum value and a minimum value of the third angular position signal and an average of a maximum value and a minimum value of a fourth angular position signal, and second offset eraser means for erasing a second offset by operating on at least one of the third angular position signal and the fourth angular position signal with the second offset ratio;
sine wave amplitude ratio memory means for memorizing a ratio of the first sine wave signal and the second sine wave signal; and
sine wave amplitude difference eraser means for erasing a difference in amplitude of the first and second sine wave signals by operating on at least one of the first and second sine wave signals with the ratio of the first and second sine wave signals.

4. An encoder in accordance with claim 3, wherein
said sine wave amplitude ratio memory means includes a table look-up system, and wherein
said sine wave amplitude difference eraser means includes an amplification factor variable digital amplifier.

5. An encoder in accordance with claim 3, further comprising:
phase difference memory means for memorizing a phase difference between a phase of the first sine wave signal and a phase of the second sine wave signal; and
phase difference adjuster means for adjusting the phase difference to approximately 90 degrees by operating on at least one of the first sine wave signal and the second sine wave signal, respectively, with a coefficient obtained from the phase difference and by operating on at least one of the first and second sine wave signals with at least one of a first signal responsive to the second sine wave signal and a second signal responsive to the first sine wave signal, respectively.

6. An encoder in accordance with claim 5, wherein
said phase difference memory means includes a table look-up system, and wherein
said phase difference adjuster means includes an amplification factor variable digital amplifier.

7. An encoder for a rotator comprising:
means for sensing angular position of A phase and for providing a first signal responsive to a first angular position of the rotator;
means for sensing angular position of B phase and for providing a second signal responsive to a second angular position of the rotator;
means for generating an offset eraser signal;
first offset ratio memory means for memorizing a first ratio of an offset of the first signal and an offset of the offset eraser signal;
first offset eraser means for providing a third signal responsive to at least one of the first ratio and the offset eraser signal;
arithmetic means for A phase for operating on the first signal and the third signal so that the offset between the first signal and the offset eraser signal is erased, and for providing a first output signal responsive to the first signal and the third signal;
second offset ratio memory means for memorizing a second ratio of an offset of the second signal and the offset of the offset eraser signal;
second offset eraser means for providing a fourth signal responsive to at least one of the second ratio and the offset eraser signal; and
arithmetic means for B phase for operating on the second signal and the fourth signal so that the offset between the second signal and the offset eraser signal is erased, and for providing a second output signal of said arithmetic means for B phase.

8. An encoder in accordance with claim 7, wherein
each of said first offset ratio memory means and said second offset ratio memory means includes a table look-up system, and wherein
each of said first offset eraser means and said second offset eraser means includes an amplification factor variable digital amplifier.

9. An encoder in accordance with claim 7, further comprising:
amplitude ratio memory means for memorizing an amplitude ratio of an amplitude of the first output signal and an amplitude of the second output signal; and
amplitude difference eraser means for operating on at least one of the first and second output signals with the amplitude ratio.

10. An encoder in accordance with claim 9, wherein said amplitude ratio memory means includes a table look-up system, and wherein
said amplitude difference eraser means includes an amplification factor variable digital amplifier.

11. An encoder in accordance with claim 9, further comprising:
phase difference memory means for memorizing a phase difference between a phase of the first output signal and a phase of the second output signal; and
phase difference adjuster means for adjusting said phase difference to approximately 90 degrees by operating on at least one of the first and second output signals with a coefficient obtained from the phase difference and by operating on at least one of the second and first output signals with a signal responsive to the first output signal or with a signal responsive to the second output signal, respectively.

12. An encoder in accordance with claim 11, wherein said phase difference memory means includes a table look-up system, and wherein
said phase difference adjuster means includes an amplitude factor variable digital amplifier.

13. An encoder for a rotator, comprising:
a first angular position sensor connected to detect a first signal responsive to a first angular position of the rotator;
a second angular position sensor connected to detect a second signal responsive to a second angular position of the rotator;
offset ratio memory means for storing a value which is used to remove a difference in amplitudes between the first and second signals; and
offset eraser means for using the value to remove the difference in amplitudes between the first and second signals.

14. An encoder system for a rotator, comprising:
an A phase encoder connected to provide a first output signal responsive to a first angular position of the rotator;
a B phase encoder connected to provide a second output signal responsive to a second angular position of the rotator;
sine wave amplitude correction memory means for storing a value which is used to remove a difference in amplitudes between the first and second output signals; and
sine wave amplitude difference eraser means for using the value to remove the difference in amplitudes between the first and second output signals.

15. An encoder system for a rotator, comprising:
an A phase encoder connected to provide a first output signal responsive to a first angular position of the rotator;
a B phase encoder connected to provide a second output signal responsive to a second angular position of the rotator;
phase difference memory means for storing a predetermined value for correcting an undesired difference in phase between the first and second output signals;
phase difference adjuster means for modifying at least one of the first and second output signals using the predetermined value to generate a phase corrected signal; and
sine wave generator means for operating on at least one of the first and second output signals with the phase corrected signal to correct the undesired difference phase.

16. An encoder system for a rotator, comprising:
a first angular position sensor connected to provide a first detection signal responsive to a first angular position of the rotator;
a second angular position sensor connected to provide second detection signal responsive to a second angular position of the rotator; and
offset eraser signal generator means for generating a correction signal which can be used to operate on at least one of the first and second detection signals so that a difference in amplitudes between the first and second detection signals is removed.

17. An encoder system for a rotator, comprising:
a first angular position sensor connected to provide a first detection signal responsive to a first angular position of the rotator;
a second angular position sensor connected to provide a second detection signal responsive to a second angular position of the rotator;
phase difference memory means for storing a predetermined value for correcting an undesired difference in phase between the first and second output signals;
phase difference adjuster means for modifying at least one of the first and second output signals using the predetermined value to generate a phase corrected signal; and
sine wave generator means for operating on at least one of the first and second output signals with the phase corrected signal to correct the undesired difference in phase.

* * * * *

UNITED STATES PATENT AND TRADEMARK OFFICE
CERTIFICATE OF CORRECTION

PATENT NO. : 5,120,954
DATED : June 9, 1992
INVENTOR(S) : Taniguchi

It is certified that error appears in the above-identified patent and that said Letters Patent is hereby corrected as shown below:

Column 3, line 32, change "phase"

to --phases--.

Column 7, line 48, after "DESCRIPTION OF"

insert --THE--.

Column 8, line 8, change "ration" to

--ratio--.

Column 9, line 56, before "erasing"

insert --resultantly--.

Column 12, line 23, change "altimate"

to --ultimate--.

UNITED STATES PATENT AND TRADEMARK OFFICE
CERTIFICATE OF CORRECTION

PATENT NO. : 5,120,954
DATED : June 9, 1992
INVENTOR(S) : Taniguchi

It is certified that error appears in the above-identified patent and that said Letters Patent is hereby corrected as shown below:

```
Column 15, line 16, change "valve"

to --value--;

Column 15, line 48, change "generator"

to --generate--;

Column 15, line 54, change "ration"

to --ratio--.
```

Signed and Sealed this

Tenth Day of August, 1993

Attest:

MICHAEL K. KIRK

*Attesting Officer*   Acting Commissioner of Patents and Trademarks